Dec. 15, 1936.  G. W. CONLEE  2,064,105
FLOWER, FRUIT, AND VEGETABLE GATHERING TOOL
Filed Oct. 14, 1935
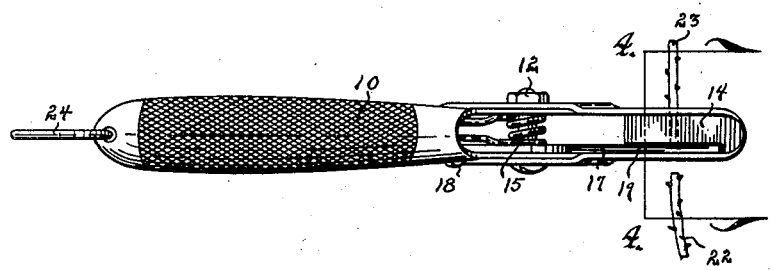
Fig. 1.
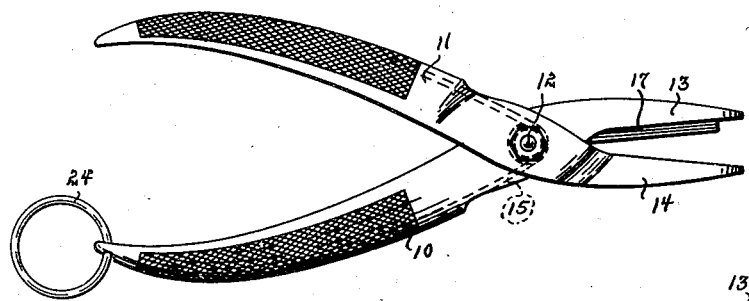
Fig. 2.
Fig. 4.
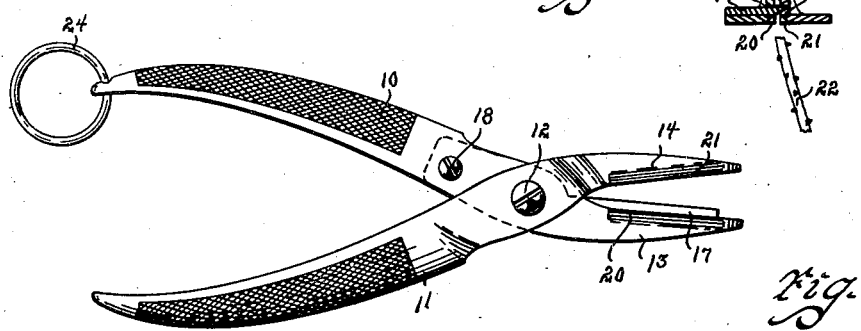
Fig. 3.
Fig. 5.
INVENTOR.
George W. Conlee
BY
M. Talbert Dick
ATTORNEY.

Patented Dec. 15, 1936

2,064,105

UNITED STATES PATENT OFFICE 2,064,105

FLOWER, FRUIT, AND VEGETABLE GATHERING TOOL

George W. Conlee, Des Moines, Iowa

Application October 14, 1935, Serial No. 44,905

1 Claim. (Cl. 30—24)

The principal object of this invention is to provide a tool for the gathering of flowers, fruit, and vegetables that not only cuts the stem holding the flower, fruit, or vegetable, but retains the severed flower, fruit, or vegetable until released, thereby making the gathering of the flower, fruit, or vegetable rapid, easy, and by the use of only one hand.

A still further object of my invention is to provide a manually operative flower, fruit, vegetable, or like gathering tool that is light in weight, economical in manufacture, and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawing, in which:

Fig. 1 is a side view of my tool cutting the stem of a flower or like and retaining that portion of the stem to which the flower is attached.

Fig. 2 is a plan view of my tool ready for use.

Fig. 3 is also a plan view of my tool, but turned over from the position shown in Fig. 2.

Fig. 4 is a cross-sectional view of my gathering tool taken on line 4—4 of Fig. 1.

Fig. 5 is a plan view of the front end portion of my tool showing the jaws of the same in closed condition.

The common method of gathering flowers, fruits, and vegetables is to cut the stems leading to the flowers, fruit, or vegetable with a pair of scissors, knife, or like using one hand and catching or holding the flower, fruit, or vegetable during the cutting process by the other hand. This not only requires both hands, but is slow and often difficult of accomplishment when the flower, fruit, or vegetable is at the extreme reach of the gatherer, or is difficult to reach through other vegetation, vines, thorns, or like. An illustration is the gathering of roses and bunches of grapes. In many instances it is not desirable to touch or bruise the member being gathered by holding it with one hand while cutting it off with the other hand. I have overcome such objections by providing a tool that will cut the stem and retrieve the flower, fruit, or vegetable with the use of only one hand and with neither of the hands directly engaging the flower, fruit, or vegetable.

Referring to the drawing, I have used the numeral 10 and 11 to generally designate two plier handle portions pivoted together between their ends by a bolt 12, as shown in the drawings. These two handle portions cross each other near their pivot point similar to that of ordinary scissors, mechanics' pinchers, pliers, or like and their forward end portions may be considered as jaw portions.

I have used the numeral 13 to designate the jaw portion of the handle portion 10 and the numeral 14 to designate the jaw portion of the handle portion 11. Each of these two jaw portions 13 and 14 have their forward ends rounded, as shown in Fig. 1, and have their facing inner sides substantially flat in order that when the handle portions 10 and 11 are manually forced together these inner sides will engage and contact each other in substantially a straight plane, as shown in Fig. 5. The numeral 15 designates a spring around the bolt 12 having its two end portions engaging the two handle portions, respectively for yieldingly holding these two handle portions apart and the jaw portions open, as shown in Fig. 3. The numeral 16 designates a longitudinal slot opening in the jaw portion 13 closely adjacent one of its outer side marginal edges, as shown in Fig. 4.

The numeral 17 designates a cutting or shearing blade on the jaw 13 extending through the longitudinal slot 16 and beyond the plane of the flat inner side of the jaw 13, as shown in Fig. 3. This blade 17 may be detachably secured to the tool by any suitable means. In the drawing, I show the blade 17 extending to the rear in order that the bolt 12 may pass through it and a securing bolt, screw, or like 18 extending through the handle 10 may also extend through it. To remove the blade for replacement, repair, or sharpening, it is merely necessary to remove the bolts 12 and 18. The numeral 19 designates a longitudinal slot opening in the jaw portion 14 closely adjacent one of its end side marginal edges and registering with the slot 16 when the jaws 13 and 14 are closed. By this construction when the jaws 13 and 14 are closed, the blade 17 will extend into the longitudinal slot 19, as shown in Fig. 4 and Fig. 5.

The numeral 20 designates a bevel on one side of the jaw 13, adjacent and communicating with the blade 17, as shown in Fig. 3 and Fig. 4. The numeral 21 designates a similar bevel portion on one side of the jaw portion 14 and closely adjacent the slot opening 19, as shown in Fig. 4. The numeral 22 designates the stem of the plant and the numeral 23 designates that portion of the stem that has been cut and severed from the main stem 22. The numeral 24 designates a finger ring secured to the end of the handle 10. This ring 24 may be used for supporting the tool on one of the fingers of the user when the tool is not being actually used for gathering flowers, fruits, or vegetables.

The operation of the device is very simple. All that is necessary is to grasp the handles 10 and 11 in the hand, allowing the spring 15 to hold the jaws 13 and 14 in open positions. The jaws are then placed around the stem to be cut. This is facilitated by the rounded free ends of the jaws 13 and 14, which eliminate any undesirable projections or flat portions that might obstruct the placing of the jaws around the stem. After the jaws have been placed around the stem to be cut the handles 10 and 11 are manually forced together, bringing the two jaws 13 and 14 together, thereby causing the cutting blade 17 to pass into the slot opening 19 and cut the stem in two, as shown in Fig. 4. This cuts the flower, fruit, or vegetable to be gathered from its original stem and by continuing to exert pressure on the handles 10 and 11 the jaws 13 and 14 will clamp between them the severed stem 23 holding the flower, fruit, or vegetable. It is then merely necessary to withdraw the tool, carrying with it the gathered flower, fruit, or vegetable.

By releasing pressure on the handles 10 and 11 the spring 15 will open the same and the jaws 13 and 14, thereby releasing the tool's hold on the stem 23. From this it will readily be seen that one may, with my tool and the use of one hand, reach easily into inaccessible places, cut a flower, fruit, or vegetable from its main stem, and retrieve it all in one operation. By the bevel portions 20 and 21 there will be no portion of the jaws 13 and 14 that will have a tendency to clamp on and hold the tool to the severed main stem 22. The width of the jaws 13 and 14 should be such that they will provide a substantial area at one side of the blade 17 in order to successfully contact a substantial portion of the cut end of the stem 23. These jaws 13 and 14 by clamping onto this severed end of the stem 23, will compress it as shown in Fig. 4, thereby substantially sealing the cut end of the stem and preventing it from "bleeding". This will preserve the flower or like gathered.

Some changes may be made in the construction and arrangement of my improved flower, fruit, and vegetable gathering tool without departing from the real spirit and purpose of my invention, and it is my intention to cover by my claim any modified forms of structure or use of mechanical equivalents which may be reasonably included within its scope.

I claim:

In a stem cutting and gathering tool, two hinged jaw members having their entire adjacent inner faces flat and straight, a longitudinal slot opening in one of said jaw members extending completely through said jaw member and resting in close proximity to one of its side longitudinal edges, a beveled side edge on said jaw member having said slot opening and in close proximity to said slot opening, a longitudinal slot opening in the other said jaw member extending completely through said jaw member and registering with the said first mentioned slot opening, a bevelled side edge on said last mentioned jaw member and in close proximity to the said slot opening in said jaw member, a detachable cutting blade in said last mentioned slot opening capable of entering said first mentioned slot opening when said jaw members are brought together for cutting a stem, and a handle member on each of said jaw members for facilitating the manual operation of the same; said inner faces of said jaw members clamping and holding one portion of a stem between them after said stem has been cut by said knife and said beveled side edges of said jaw members preventing the clamping and holding of the other portion of the stem cut by said knife by said jaw members.

GEORGE W. CONLEE.